(12) United States Patent
Ritter

(10) Patent No.: US 10,437,788 B2
(45) Date of Patent: Oct. 8, 2019

(54) AUTOMATIC DETECTION, RETRY, AND RESOLUTION OF ERRORS IN DATA SYNCHRONIZATION

(71) Applicant: SAP SE, Walldorf (DE)

(72) Inventor: Gerd Martin Ritter, Heidelberg (DE)

(73) Assignee: SAP SE, Walldorf (DE)

( * ) Notice: Subject to any disclaimer, the term of this patent is extended or adjusted under 35 U.S.C. 154(b) by 547 days.

(21) Appl. No.: 14/962,516

(22) Filed: Dec. 8, 2015

(65) Prior Publication Data
US 2017/0161296 A1    Jun. 8, 2017

(51) Int. Cl.
*G06F 16/178* (2019.01)
*G06F 16/11* (2019.01)
*G06F 11/20* (2006.01)

(52) U.S. Cl.
CPC ........ *G06F 16/178* (2019.01); *G06F 11/2082* (2013.01); *G06F 16/11* (2019.01)

(58) Field of Classification Search
CPC .......... G06F 17/30575; G06F 11/1662; G06F 17/30174; G06F 16/178; G06F 11/2082; G06F 16/11
USPC ........................................ 707/611, 613, 624
See application file for complete search history.

(56) References Cited

U.S. PATENT DOCUMENTS

| | | | |
|---|---|---|---|
| 5,309,413 A * | 5/1994 | Chan ...................... | G04G 13/00 368/187 |
| 7,782,805 B1 * | 8/2010 | Belhadj ................... | H04L 47/10 370/300 |
| 7,925,625 B2 * | 4/2011 | Mathew .................. | G06Q 10/00 707/610 |
| 9,755,781 B2 * | 9/2017 | Qi ...................... | H03M 13/6306 |
| 2002/0039244 A1 * | 4/2002 | Wilson ................... | G11B 19/04 360/25 |
| 2005/0262077 A1 * | 11/2005 | Barnes ................ | G06F 16/2379 707/E17.007 |
| 2008/0172679 A1 * | 7/2008 | Shen ...................... | H04L 69/40 719/318 |
| 2009/0037769 A1 * | 2/2009 | Babkin ............. | G06F 16/24568 714/15 |
| 2009/0083088 A1 * | 3/2009 | Mathew .................. | G06Q 10/00 705/7.37 |
| 2010/0174734 A1 * | 7/2010 | Norbauer ............ | G06F 16/2379 707/769 |
| 2014/0201145 A1 * | 7/2014 | Dorman .................. | G06F 16/27 707/634 |
| 2014/0316830 A1 * | 10/2014 | Langhorne ......... | G06Q 10/0631 705/7.12 |
| 2015/0271148 A1 * | 9/2015 | Ahari .................. | G06Q 10/0633 713/153 |
| 2016/0099963 A1 * | 4/2016 | Mahaffey ............ | H04L 63/0227 726/25 |

(Continued)

*Primary Examiner* — Phong H Nguyen
(74) *Attorney, Agent, or Firm* — Sterne, Kessler, Goldstein & Fox P.L.L.C.

(57) ABSTRACT

Disclosed herein are system, method, and computer program product embodiments for the automatic detection, retry, and resolution of errors in data synchronization. An embodiment operates by receiving one or more changes to a local copy of a master document. An error is detected during a synchronization of the one or more changes with the master document. A count is incremented and the synchronization is retried until either the synchronization completes or a threshold has been reached.

17 Claims, 4 Drawing Sheets

(56) References Cited

U.S. PATENT DOCUMENTS

2017/0063615 A1\* 3/2017 Yang .................. H04L 41/5054

\* cited by examiner

AUTOMATIC DETECTION, RETRY, AND RESOLUTION OF ERRORS IN DATA SYNCHRONIZATION

BACKGROUND

Data synchronization is an important function of enterprise systems in which documents are shared between multiple users who may independently access or modify the documents, particularly when such access occurs locally across different devices. However, when errors occur during a data synchronization process, they require a user to manually review and fix the error. Not only is this type of manual user review burdensome to the user but it also creates unnecessary delays in processing of synchronization requests if the system has to wait for user review.

BRIEF DESCRIPTION OF THE DRAWINGS

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Provided herein are system, method and/or computer program product embodiments, and/or combinations and sub-combinations thereof, for the automatic detection, retry, and resolution of errors in data synchronization.

Figure 1:
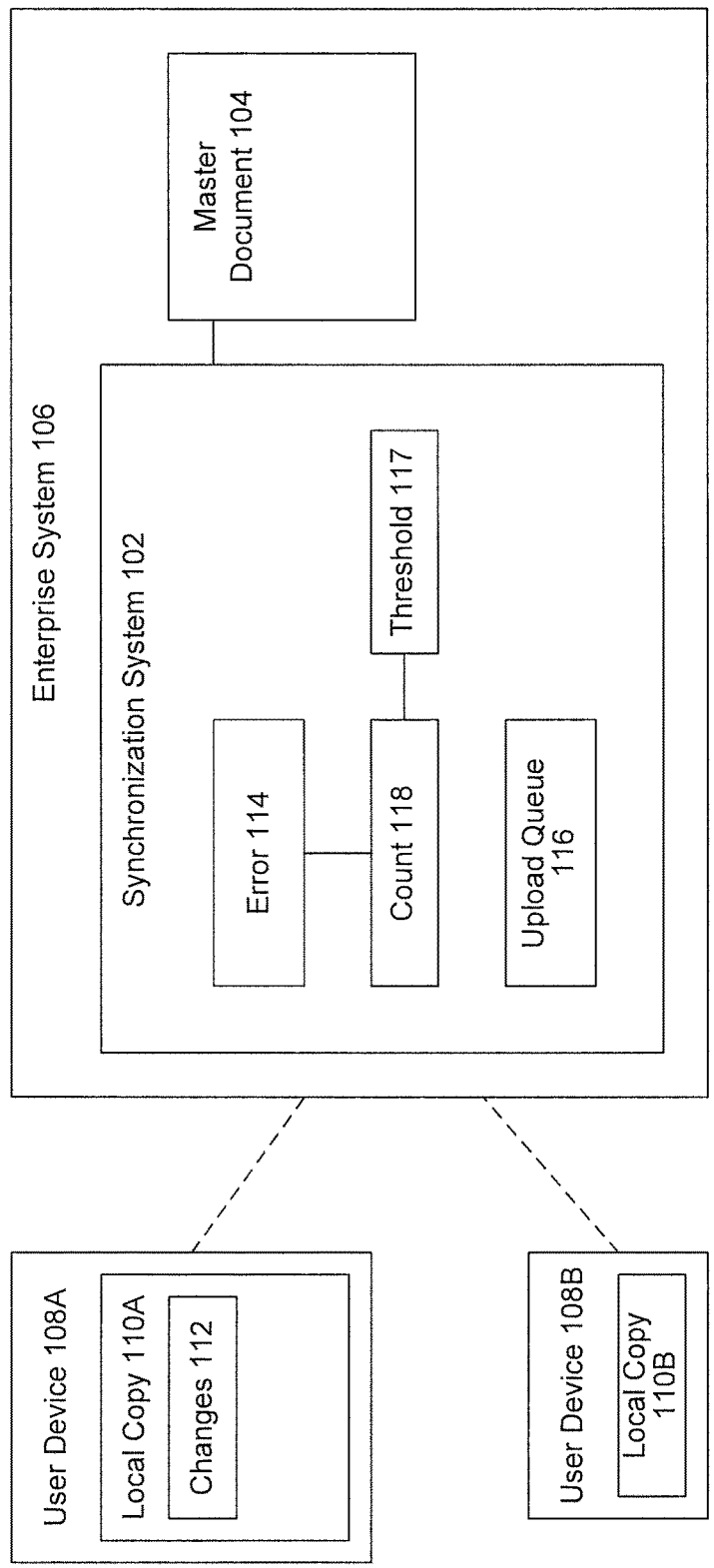
FIG. 1 is a block diagram of a system that automatically detects, retries, and resolves errors in data synchronization, according to an embodiment.

FIG. 1 is a block diagram of a system 100 for the automatic detection, retry, and resolution of errors in data synchronization, according to an example embodiment. A synchronization system 102 may manage data synchronization for one or more master documents 104 of an enterprise system 106 and may automatically detect, retry, and resolve errors that may occur as part of a data synchronization process. Synchronization system 102 may automatically identify errors that do not or may not require user intervention for resolution, and may automatically retry a synchronization process when the identified errors have been resolved.

Enterprise system 106 may include any computing system or network that allows multiple users or user devices 108 to access and/or update data, such as master doc 104. As used herein, the terms user and user device 108 are used interchangeably. Example enterprise systems 106 may include a cloud data system, or a business communication system. For example, a business may maintain or have an enterprise system 106 that enables communication, including document sharing across different users 108. Enterprise system 106 may include one or more document stores that include various documents pertinent or related to a business, or other data objects (collectively referred to herein as master documents 104). Example master documents 104 include word processing documents, spreadsheets, databases, account data, business unit data, metadata related to other documents or data or any other data or documents. These master documents 104 (i.e., master does 104) may be used, modified, or otherwise accessed by multiple users 108 within and/or outside the business organization. Enterprise system 106 may provide users 108 the ability to access/modify master does 104 online and/or offline.

In online data access, a user 108A may directly make changes, updates, or modifications to master doc 104 while being communicatively coupled to enterprise system 106. In an embodiment, while user 108A is updating master doc 104 through online access, master doc 104 may be locked so as to prevent other users 108B from simultaneously changing the data of master doc 104 in an online mode. However, user 108B may update a local or offline copy 110B of the master doc 104 even while master doc 104 is being accessed by user 108A, or is being synchronized with a local copy 110A.

In offline data access, multiple users 108 may each make changes, updates, or modifications to a local copy 110 of master doc 104. Local copy 110 may include a snapshot, a copy, or a partial copy of the data of master doc 104 that is locally accessible at one or more user devices 108. Offline data access and modification, as provided by enterprise system 106, may enable users who are working remotely and/or do not have constant access/connectivity to enterprise system 106 to nonetheless access and modify master does 104 maintained on enterprise system 106. In an embodiment, offline access to the data from master does 104 may provide faster access or better performance, rather than requiring constant connectivity or communication between enterprise system 106 and a user device 108. This offline access allows multiple users to simultaneously access and/or modify the data of master doc 104, but on their own local copies 110.

The offline changes 112 made by different users 108 may periodically be communicated to or otherwise synchronized with enterprise system 106 through synchronization system 102. Synchronization system 102 may receive, queue, and process these change requests, and update master doc 104 accordingly. The synchronization process may include both the upload of changes 112 received from a user device 108, as well as the download of changes from master doc 104 to a user device 108 (as local copy 110.

In an embodiment, different user devices 108A and 108B may each have their own local copy 110A and 110B, respectively, of one or more master does 104 stored on enterprise system 106. Users 108 may work offline with their local copy 110, modifying, adding, and removing data. User device 108 may periodically upload changes 112 made to local copy 110 to synchronization system 102. Synchronization system 102 may then update master doc 104 accordingly.

Synchronization system 102 may receive a change request including changes 112 made to local copy 110 and store the change request in an upload queue 116. Upload queue 116 may be a queue of change or modification requests received from the same or different users and/or user devices 108 of enterprise system 106. In an embodiment, different master does 104 or document types (e.g., word processing, spreadsheet, pertaining to one or more programs or applications) may have their own upload queues 116 for change requests pertaining to the respective documents 104, or a single upload queue 116 may receive change requests across different master documents 104 or document types.

Upload queue 116 may prioritize received change requests 112 based on any different number or combination of priority schemes. Example priority schemes include last-in-first-out (LIFO) and first-in-first-out (FIFO) basis. Or, for example, the priority scheme may include prioritizing change requests based on a priority of a user 108 associated with the request, a priority of the data and/or document 104 being updated, or any other priority factor.

Synchronization system 102 may then retrieve and process change requests from upload queue 116. The change requests may include changes 112 and other information relevant to synchronizing the data of local copy 110A and master doc 104. This additional information may include, for example, a document identifier, timestamp information, when a change request was received or queued, a document locator, a username or device name associated with changes 112, and/or other information.

The document identifier may be a unique document name, number, or other identifier used to identify master doc 104 on enterprise system 106. In an embodiment, different master does 104 may each have different identifiers that uniquely identify the master doc 104 on enterprise system 106. When local copy 110 is generated and/or synchronized, a copy of the document identifier may be provided to user device 108 that indicates a document, version, or timestamp indicator 114B associated with master doc 104 that can be used to determine with which version of master doc 104 local copy 110 has been synchronized.

The document locator may include an indication of where master doc 114 is stored or located on enterprise system 106. The document locator may include, for example, a drive, folder, memory location, address or path, table, document type, or other storage identifier that may indicate where master doc 104 is stored. The document identifier may be any information that may help narrow or otherwise speed up a search for master doc 104 on enterprise system 106 when being synchronized with one or more user devices 108 and/or changes 112. The document locator information may save time and/or resources when enterprise system 106 manages a large volume of documents 104 being synchronized across a large number of user devices 108. For example, rather than having to search through all the stored master does 104 for a provided indicator, the document locator may specify a particular drive, folder, or table to search.

In an embodiment, a local copy 110 of a master doc 104 may have its own timestamp. The timestamp may indicate when local copy 110A was copied/stored on user device 108A, previously synchronized with master doc 104, and/or previously edited by one more users operating a user device 108.

When synchronization system 102 retrieves changes 112 from upload queue 116, synchronization system 102 attempts to synchronize the data of master doc 104 with changes 112. However, during the synchronization process synchronization system 102 may detect or identify one or more errors 114 that need to be resolved before synchronization can complete.

An error 114 may be an event that occurs that prevents one or more changes 112 from being implemented on, or otherwise synchronized with, master doc 104. For example, error 114 may prevent a modification of master doc 104 and/or local copy 110 during a synchronization process.

In an embodiment, when an event occurs that prevents a synchronization process from completing (e.g., changes 112 from being implemented with master doc 104 and/or providing intermediary updates made to master doc 104 since a timestamp of a local copy 110 for implementation with the local copy 110), synchronization system 102 may determine a nature of the event.

Synchronization system 102 may determine the nature, category, or cause of the event that prevented synchronization. The identified nature of the event may allow synchronization system 102 to determine how the event may be best or most easily, effectively or efficiently resolved so that synchronization of changes 112 may be completed in the shortest time or most efficient way possible, including whether or not user involvement or interaction is necessary for a resolution of the event. In an embodiment, there may be two general types of such events: conflicts and errors 114. A conflict may require user intervention for resolution of event and/or for a synchronization process to successfully complete. Error 114, by contrast, may not require user intervention for resolution of the event or for the synchronization process to successfully complete.

In an embodiment, the user intervention may be specified as being associated with or originating from one or more particular users. For example, the user intervention may refer to a user (or user device) 108A that provided the changes 112 which were unsuccessfully synchronized. In such cases, if resolution of event does not require notification to or further action by the user 108 who provided changes 112, then the event may be classified as an error 114. However, if the uploading user 108 is required to take a particular action (e.g., such as provide additional information), then the event may be identified as being a conflict. In another embodiment, the user may include a group of users, such that if none of a specified group of users (that may or may not include the uploading user 108) need to take action to resolve the event, the event may be classified as an error 114.

In an embodiment, synchronization system 102 may classify an event as an error 114 because it is possible to resolve the event without user intervention. However, after performing a number of retries or waiting a specified period of time, synchronization system 102 may ultimately determine that successful resolution of the error 114 may require user intervention for successful completion. In those situations, the event may be reclassified as a conflict.

One approach to the detection and resolution of conflicts that may require user intervention for resolution is described in co-pending application Ser. No. 14/962,435, entitled "Detection and Resolution of Conflicts in Data Synchronization", filed Dec. 8, 2015, which is hereby incorporated by reference in its entirety.

There are different types of errors 114 that may be identified, resolved, and retried by synchronization system 102. Example errors 114 include a lock error, a data creation error, a blocking error, and a technical error. In other embodiments additional and/or different errors 114, such as a data mismatch error, may be identified, resolved, and/or retried by synchronization system 102.

A lock error 114 may occur when two or more users 108 are attempting to simultaneously access master doc 104 (or a common portion or data of master doc 104). For example, user device 108A may attempt to synchronize changes 112 with master doc 104. However, prior to the synchronization by user device 108A, user device 108B may already be accessing or changing the data of master doc 104 (e.g., performing a synchronization, data copy, or other process) which may cause master doc 104 (or a portion thereof) to be locked from editing. As such, user device 108A may be denied access to master doc 104 until user device 108B is no longer accessing master doc 104. In an embodiment, the lock error 114 may be resolved either when user device 108B exits master doc 104, or upon the expiration of a time-out period at the completion of which the lock may be released and master doc 104 may be made available to other users 108.

A data creation error 114 may occur when changes 112 are directed to updating data that has not yet been created in master doc 104 and/or enterprise system 106. For example, a user 108A may request the creation of a new customer account on a first date or time. At a later date or time, user 108A may synchronize changes 112 that affect or change data of the new user account in master doc 104. However, at the time of synchronization (e.g., the later date or time), the new user account may not have yet been created for any number of reasons. For example, the creation of a new account may require approval from one or more other users, or may have a specified delay or hold period before creation. As such, the data creation error 114 may be resolved upon receiving the approval or at the expiration of the delay period. In either scenario, a user 108A would not need to be notified to take any action to resolve the data creation error 114.

In an embodiment, a message may be sent to the user(s) who may need to take action prior to or subsequent to one or more synchronization retries to resolve the data synchronization error 114. For example, there may be a threshold 117 for how many retries (e.g., count 118) may be performed responsive to a particular error 114. After threshold 117 is reached, a message or notification may be sent to one or more users to resolve or expedite the resolution the error 114.

A blocking error 114 may occur when user device 108A may be temporarily blocked from updating or accessing master doc 104. For example, user device 108A may be associated with a new employee who has not yet been granted permissions to access master doc 104. Or, for example, master doc 104 may be temporarily blocked for all users because of a business issue that is working on being resolved with a client associated with master doc 104 (e.g., such as a business negotiation, rate or price adjustment, contract renewal, etc.). The blocking error 114 may be resolved when user device 108A is granted access to master doc 104 or otherwise when the block is lifted and may not require any action by user 108.

A technical error 114 may occur when changes 112 cannot be made to master doc 104 due to a temporary technical malfunction or outage. For example, enterprise system 106 may be upgraded which may take master doc 104 offline for a period of time. Or, for example, there may be a temporary outage preventing communication between synchronization system 102 and master doc 104, such as a system reboot. The technical error 114 may be resolved after a period of time without any action by user 108 (or any other user).

After an error 114 has been detected, synchronization system 102 may perform one or more retries on the failed synchronization(s). In an embodiment, synchronization system 102 may wait a period of time before retrying a failed synchronization. Count 118 may be a count of how many times synchronization has been tried or retried. Threshold 117 may be a maximum number retry attempts and/or a maximum time period. When count 118 is greater than or equal to threshold 117, or when the maximum time period of threshold 117 has expired, a notification may be sent to one or more users (including user 108) requesting resolution of the error 114. In an embodiment, synchronization system 102 may notify other users and request resolution of the error 114, and threshold 117 may indicate when user 108 (who provided changes 112 that resulted in error 114) is notified about the error 114.

Figure 2:
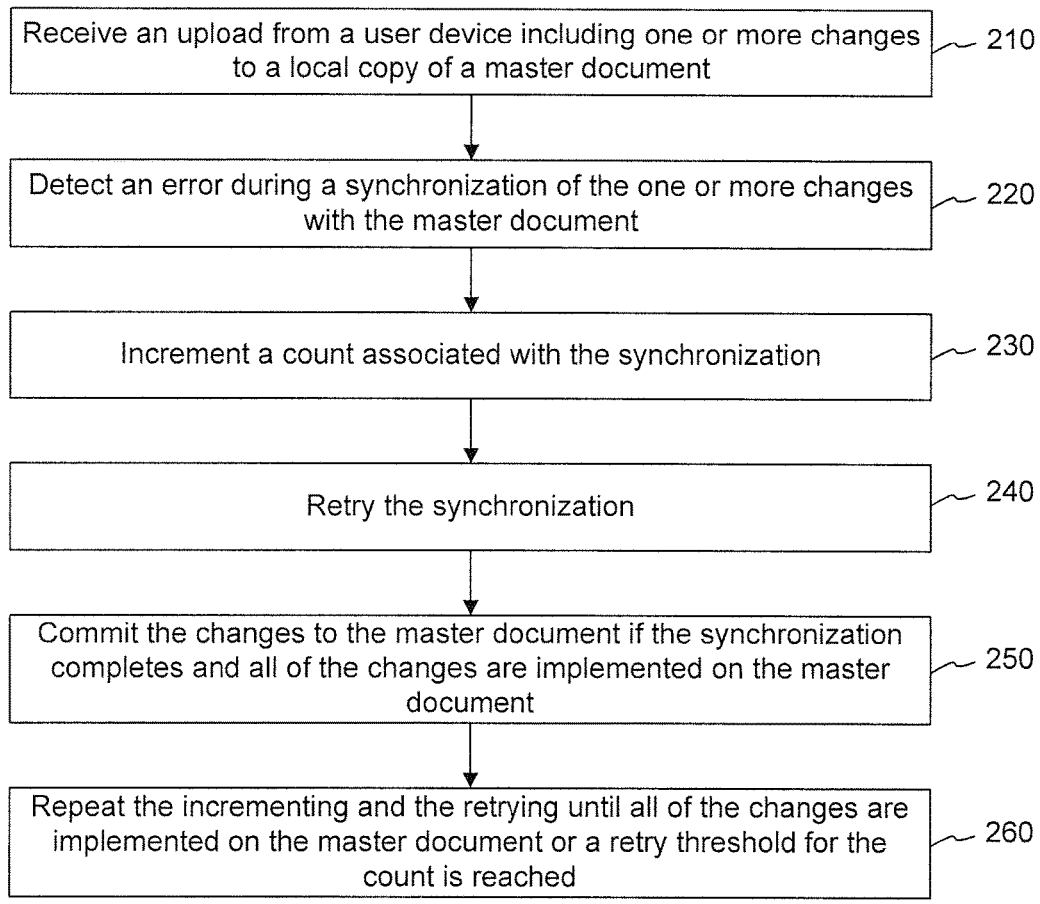
FIG. 2 is a flowchart for a method for the automatic detection, retry, and resolution of errors in data synchronization, according to an embodiment.

FIG. 2 is a flowchart for a method 200 for the automatic, detection, retry, and resolution of errors in data synchronization, according to an embodiment. Method 200 can be performed by processing logic that can comprise hardware (e.g., circuitry, dedicated logic, programmable logic, microcode, etc.), software (e.g., instructions executing on a processing device), or a combination thereof.

In step 210, an upload is received from a user device (i.e., a data transfer is received from a user device), the upload including one or more changes to a local copy of a master document. For example, synchronization system 102 may receive changes 112 from user device 108A indicating modifications (addition, deletion, changes) to be made to data of master doc 104. In an embodiment, changes 112 may include atomic changes which must be all incorporated on master doc 104 or none at all, or modifications across several different master does 104. For example, if changes 112 are part of an atomic transaction, upon a determination that a portion of changes 112 could not be implemented, any changes 112 that were implemented may be rolled back. The rolling back may include not saving or confirming the changes 112 that were implemented, or otherwise undoing whatever changes 112 of the atomic transaction that were implemented.

In step 220, an error is detected during a synchronization of the one or more changes with the master document. For example, synchronization system 102 may detect or determine that one or more changes 112 to be made to master doc 104 failed or were otherwise not implemented/saved.

In step 230, a count associated with the synchronization is incremented. For example, synchronization system 102 may increment count 118 each time one or more changes 112 fail to be implemented or synchronized with master doc 104.

In step 240, the synchronization is retried. For example, synchronization system 102 may signal or cause changes 112 to be re-executed. In an embodiment, synchronization system 102 may wait for a period of time before the retry. During the wait period, other changes 112 may be implemented on one or more master does 104. In an embodiment, synchronization system 102 may cause multiple failed changes 112 to be retried at the same time as part of a batch process.

In step 250, the changes are committed to the master document if the synchronization completes and all of the changes are implemented on the master document. For example, if on the retry changes 112 were successfully entered on master doc 104, those changes 112 may be saved. Also, a copy of master doc 104 (or a relevant portion thereof) may be provided to user device 108A so that local copy 110A may be updated. Similarly, an update timestamp of local copy 110A may be updated.

In step 260, in an embodiment, the incrementing and the retrying are repeated until all of the changes are implemented on the master document or a retry threshold for the count is reached. For example, changes 112 may be retried up until a threshold 117 is reached. Threshold 117 may indicate a maximum number of retries and/or a maximum time period, after which changes 112 are discarded or otherwise paused (e.g., saved as pending changes), and user 108 (and/or one or more other users) is notified of the error 114. In an embodiment, the notified user(s) 108 may be requested to provide a resolution to error 114 so that the synchronization process can complete.

Figure 3:
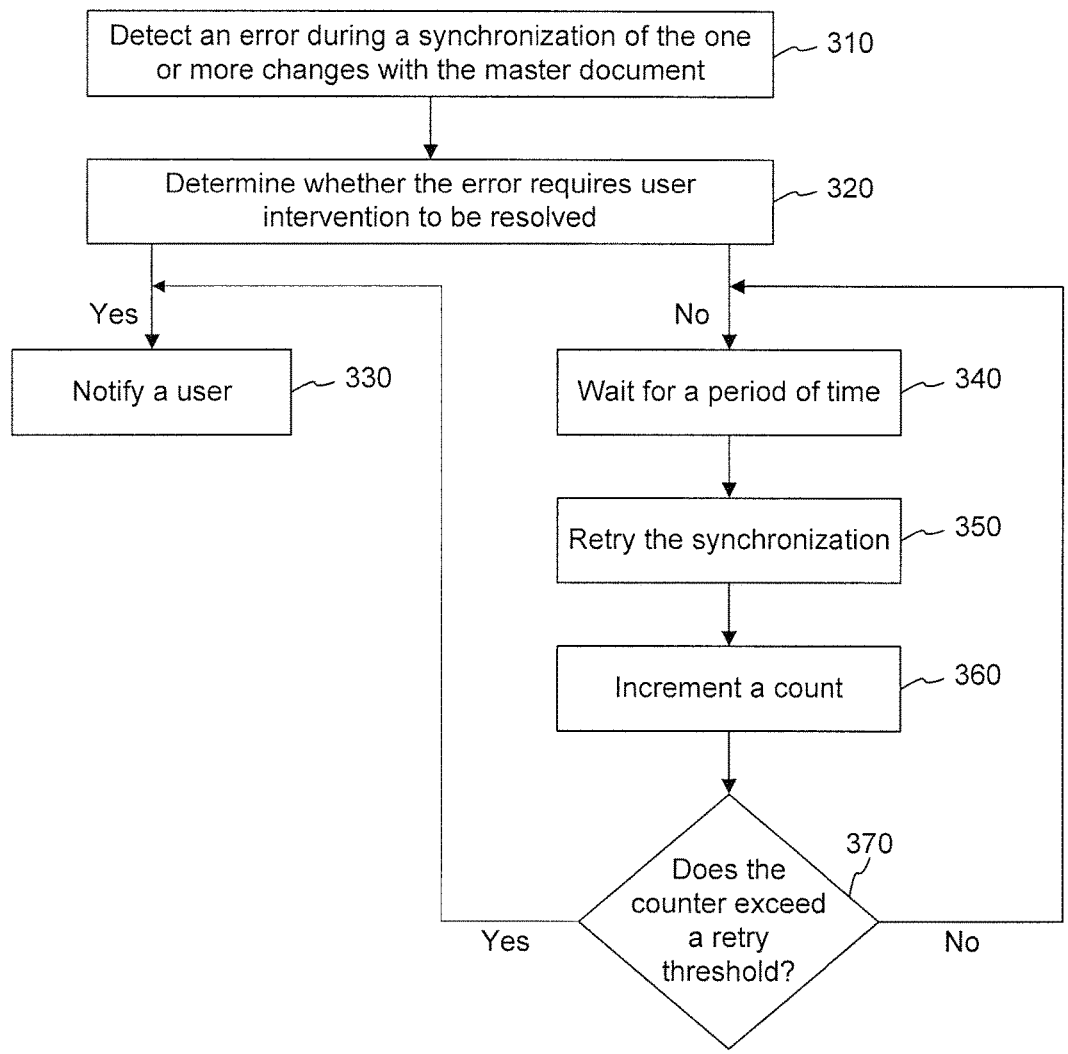
FIG. 3 is a flowchart for a method for the automatic detection, retry, and resolution of errors in data synchronization, according to another embodiment.

FIG. 3 is a flowchart for a method 300 for the automatic, detection, retry, and resolution of errors in data synchronization, according to another embodiment. Method 300 can be performed by processing logic that can comprise hardware (e.g., circuitry, dedicated logic, programmable logic, microcode, etc.), software (e.g., instructions executing on a processing device), or a combination thereof.

In step 310, an error is detected during a synchronization of one or more changes with a master document. For example, synchronization system 102 may attempt to change or otherwise signal another system to change master doc 104 to include changes 112 as provided by one or more user devices 108.

In step 320, it is determined whether the error requires user intervention to be resolved. For example, synchronization system 102 may determine whether the error is one of a lock error, data creation error, blocking error, technical error, or other error that does not require a user (e.g., user 108) intervention for resolution.

In step 330, if it is determined in step 320 that the error requires user intervention for resolution, a user is notified. For example, synchronization system 102 may determine that the event that prevented resolution is a conflict that requires user 108 intervention for resolution. Then, for example, synchronization system 102 may contact or notify the user(s) 108 of the event, and may request a resolution to the event such that the synchronization process can complete or the changes 112 may be discarded or ignored.

In step 340, if it is determined in step 320 that the error does not require user intervention for resolution, a period time may pass. For example, synchronization system 102 may determine that the event was an error 114 that may be resolved by one or more automatic retries of the synchronization process. However, prior to retrying the changes 112, synchronization system 102 may wait a specified period of time before retrying the changes. Or, for example, synchronization system 102 may perform or synchronize master doc 104 with one or more other changes 112 that do not results in an error 114.

In step 350, synchronization may be retried. For example, synchronization system 102 may cause the synchronization process of one or more failed changes 112 to be retried on one or more master does 104. In an embodiment, this may be performed during part of a batch processing when different failed changes 112 are all retried. Or, for example, if multiple changes 112 failed due to the same error 114 (such as a technical error), a first change may be retried. If the first change succeeds, the remaining changes 112 may be implemented. If, however, the first change fails again, then the remaining changes which failed due the same error may be skipped (but their count 118 or count 118 associated with the technical error 114 may nonetheless still be incremented in step 360).

In step 360, a count may be incremented. For example, for those changes 112 that failed on the retry, synchronization system 102 may increment count 118.

In step 370, it is determined whether a counter exceeds a threshold. For example, synchronization system 102 may continue to retry synchronizing changes 112 until a threshold 117 is reached. Threshold 117 may indicate a maximum time, maximum resources and/or number of retries before a user 108 is notified of the error. If the threshold 117 has not been reached, synchronization system 102 may wait a period of time (step 340) before retrying the changes (step 350). However, if threshold 117 has been reached, the user 108 may be notified (step 330).

Figure 4:
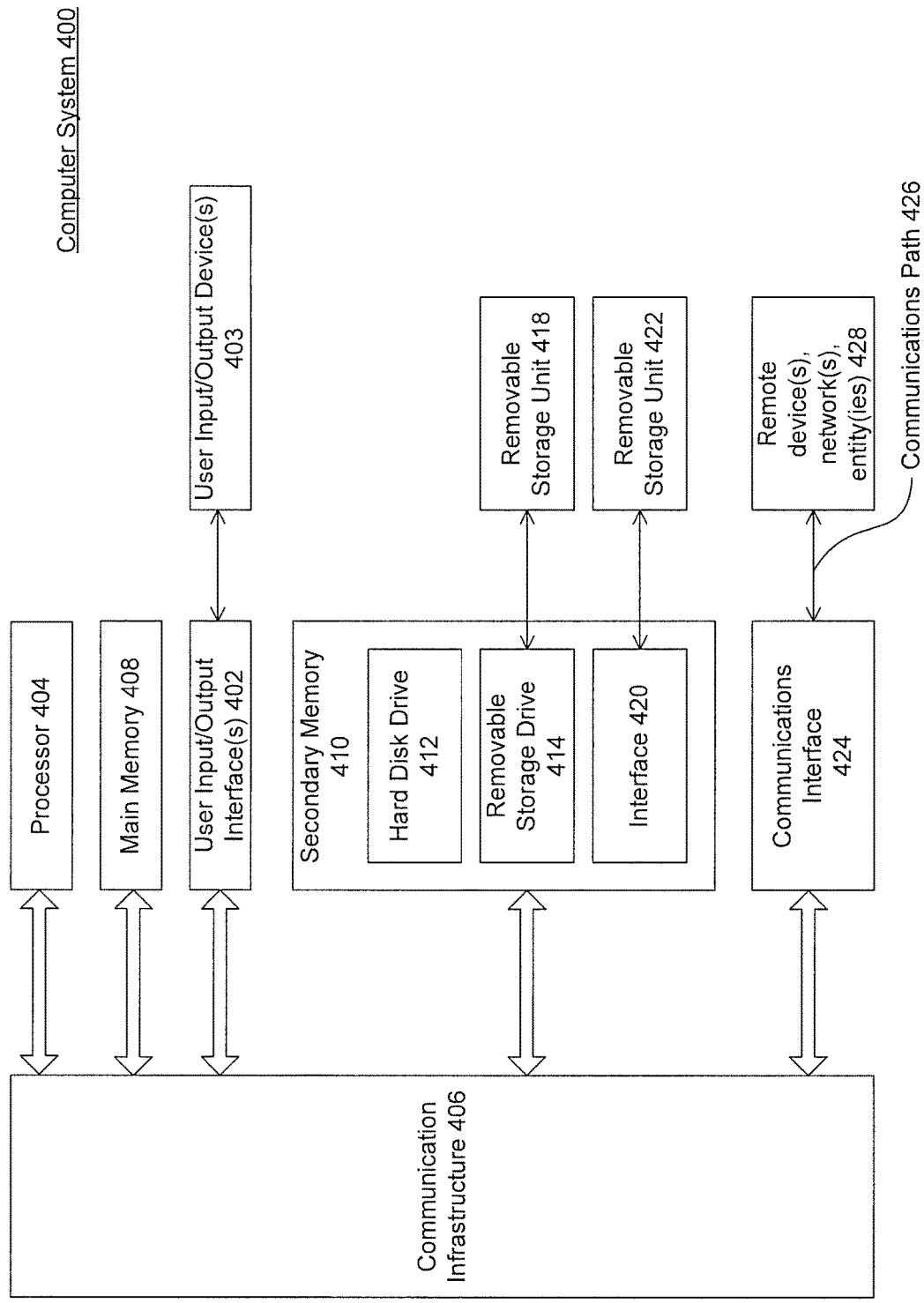
FIG. 4 is an example computer system useful for implementing various embodiments.

Various embodiments can be implemented, for example, using one or more well-known computer systems, such as computer system 400 shown in FIG. 4. Computer system 400 can be any well-known computer capable of performing the functions described herein.

Computer system 400 includes one or more processors (also called central processing units, or CPUs), such as a processor 404. Processor 404 is connected to a communication infrastructure or bus 406.

One or more processors 404 may each be a graphics processing unit (GPU). In an embodiment, a GPU is a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 400 also includes user input/output device(s) 403, such as monitors, keyboards, pointing devices, etc., that communicate with communication infrastructure 406 through user input/output interface(s) 402.

Computer system 400 also includes a main or primary memory 408, such as random access memory (RAM). Main memory 408 may include one or more levels of cache. Main memory 408 has stored therein control logic (i.e., computer software) and/or data.

Computer system 400 may also include one or more secondary storage devices or memory 410. Secondary memory 410 may include, for example, a hard disk drive 412 and/or a removable storage device or drive 414. Removable storage drive 414 may be a floppy disk drive, a magnetic tape drive, a compact disk drive, an optical storage device, tape backup device, and/or any other storage device/drive.

Removable storage drive 414 may interact with a removable storage unit 418. Removable storage unit 418 includes a computer usable or readable storage device having stored thereon computer software (control logic) and/or data. Removable storage unit 418 may be a floppy disk, magnetic tape, compact disk, DVD, optical storage disk, and/any other computer data storage device. Removable storage drive 414 reads from and/or writes to removable storage unit 418 in a well-known manner.

According to an exemplary embodiment, secondary memory 410 may include other means, instrumentalities or other approaches for allowing computer programs and/or other instructions and/or data to be accessed by computer system 400. Such means, instrumentalities or other approaches may include, for example, a removable storage unit 422 and an interface 420. Examples of the removable storage unit 422 and the interface 420 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 400 may further include a communication or network interface 424. Communication interface 424 enables computer system 400 to communicate and interact with any combination of remote devices, remote networks, remote entities, etc. (individually and collectively referenced by reference number 428). For example, communication interface 424 may allow computer system 400 to communicate with remote devices 428 over communications path 426, which may be wired and/or wireless, and which may include any combination of LANs, WANs, the Internet, etc. Control logic and/or data may be transmitted to and from computer system 400 via communication path 426.

In an embodiment, a tangible apparatus or article of manufacture comprising a tangible computer useable or readable medium having control logic (software) stored thereon is also referred to herein as a computer program product or program storage device. This includes, but is not limited to, computer system 400, main memory 408, secondary memory 410, and removable storage units 418 and 422, as well as tangible articles of manufacture embodying any combination of the foregoing. Such control logic, when executed by one or more data processing devices (such as computer system 400), causes such data processing devices to operate as described herein.

Based on the teachings contained in this disclosure, it will be apparent to persons skilled in the relevant art(s) how to make and use embodiments of the invention using data processing devices, computer systems and/or computer architectures other than that shown in FIG. 4. In particular, embodiments may operate with software, hardware, and/or operating system implementations other than those described herein.

It is to be appreciated that the Detailed Description section, and not the Summary and Abstract sections (if any), is intended to be used to interpret the claims. The Summary and Abstract sections (if any) may set forth one or more but not all exemplary embodiments of the invention as contemplated by the inventor(s), and thus, are not intended to limit the invention or the appended claims in any way.

While the invention has been described herein with reference to exemplary embodiments for exemplary fields and applications, it should be understood that the invention is not limited thereto. Other embodiments and modifications thereto are possible, and are within the scope and spirit of the invention. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments may perform functional blocks, steps, operations, methods, etc. using orderings different than those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein.

The breadth and scope of the invention should not be limited by any of the above-described exemplary embodiments, but should be defined only in accordance with the following claims and their equivalents.

What is claimed is:

1. A computer implemented method for accessing a cache, comprising:
   receiving one or more changes to a local copy of a master doc from a user device, wherein the master doc is shared among two or more users, and wherein the user device includes the local copy;
   detecting a synchronization error during a synchronization of the one or more changes with the master doc, wherein the synchronization error prevents at least one of the changes to the local copy of the master doc from being implemented on the master doc;
   incrementing a count associated with the synchronization;
   retrying the synchronization;
   committing the changes to master doc if the synchronization completes and the changes are implemented on the master doc;
   repeating the incrementing and the retrying until the changes are implemented on the master doc or the count reaches a retry threshold;
   identifying a particular user associated with the synchronization error, wherein the particular user is associated with the one more changes to the local copy resulting in the synchronization error;
   providing a notification to the particular user that the synchronization error has been detected, wherein the synchronization error comprises a data conflict that requires user intervention for resolution;
   requesting a resolution of the synchronization error from the user device based on the count reaching the retry threshold, wherein the resolution received from the user device, responsive to the synchronization error, comprises granting permission to the particular user to access the master doc and enables the synchronization to complete; and
   wherein at least one of the receiving, detecting, incrementing, retrying, committing, and repeating are performed by one or more computers.

2. The method of claim 1, wherein the retrying comprises:
   retrying only changes that were prevented from being implemented on the master doc during the synchronization.

3. The method of claim 1, further comprising:
   determining that the received changes comprise an atomic transaction; and
   if an error was detected during the synchronization, then rolling back the master doc to a state where the received changes are not implemented on the master doc.

4. The method of claim 1, wherein the incrementing comprises:
   determining that one or more of changes are not implemented upon the completion of the retrying; and
   incrementing the count associated with the synchronization.

5. The method of claim 1, further comprising:
   determining, prior to the retrying, that the changes that were not implemented do not require input from a user to be implemented.

6. The method of claim 1; wherein the repeating comprises:
   performing a second synchronization prior to the retrying the synchronization.

7. The method of claim 6, wherein the received changes are associated with a first user, and the second synchronization is associated with a second user different from the first user.

8. The method of claim 1, wherein a first retry threshold for a first error is different from a second retry threshold of a second error.

9. The method of claim 1, further comprising:
receiving the resolution of the synchronization error resolving the data conflict from the user device.

10. A system comprising:
a memory; and
at least one processor coupled to the memory and configured to:
receive, from a user device, one or more changes to a local copy of a master doe, wherein the master doe is shared amongst two or more users, and wherein the user device includes the local copy;
detect a synchronization error during a synchronization of the one or more changes with the master doe, wherein the synchronization error prevents at least one of the changes to the local copy of the master doe from being implemented on the master doe;
increment a count associated with the synchronization;
retry the synchronization;
commit the changes to master doe if the synchronization completes and all of the changes are implemented on the master doe;
repeat the incrementing and the retrying until the changes are implemented on the master doc or the count reaches a retry threshold;
identify a particular user associated with the synchronization error, wherein the particular user is associated with the one more changes to the local copy resulting in the synchronization error;
provide a notification to the particular user that the synchronization error has been detected, wherein the synchronization error comprises a data conflict that requires user intervention for resolution; and
request a resolution of the synchronization error from the user device based on the count reaching the retry threshold, wherein the resolution received from the user device, responsive to the synchronization error, comprises granting permission to the particular user to access the master doe and enables the synchronization to complete.

11. The system of claim 10, wherein the retry comprises:
retry only the one or more changes that were prevented from being implemented on the master doe during the synchronization.

12. The system of claim 10, further comprising:
determine the received changes comprise an atomic transaction; and
if an error was detected during the synchronization, then rolling back the master doc to a state wherein the received changes are not implemented on the master doc.

13. The system of claim 10, wherein the increment comprises:
determine that one or more of changes are not implemented upon the completion of the retrying; and
increment the count associated with the synchronization.

14. The system of claim 10, wherein the repeating comprises:
perform a second synchronization prior to the retrying the synchronization.

15. The system of claim 14, wherein the uploaded one or more changes are associated with a first user, and the second synchronization is associated with a second user different from the first user.

16. The system of claim 10, wherein a first retry threshold for a first error is different from a second retry threshold of a second error.

17. A tangible computer-readable device having instructions stored thereon that, when executed by at least one computing device, causes the at least one computing device to perform operations comprising:
receiving one or more changes to a local copy of a master doe from a user device, wherein the master doe is shared among two or more users, and wherein the user device includes the local copy;
detecting a synchronization error during a synchronization of the one or more changes with the master doc, wherein the synchronization error prevents at least one of the changes to the local copy of the master doc from being implemented on the master doc;
incrementing a count associated with the synchronization;
retrying the synchronization;
committing the changes to master doe if the synchronization completes and the changes are implemented on the master doc;
repeating the incrementing and the retrying until the changes are implemented on the master doc or the count reaches a retry threshold;
identifying a particular user associated with the synchronization error, wherein the particular user is associated with the one more changes to the local copy resulting in the synchronization error;
providing a notification to the particular user that the synchronization error has been detected, wherein the synchronization error comprises a data conflict that requires user intervention for resolution; and
requesting a resolution of the synchronization error from the user device based on the count reaching the retry threshold, wherein the resolution received from the user device, responsive to the synchronization error, comprises granting permission to the particular user to access the master doe and enables the synchronization to complete.

* * * * *